United States Patent [19]

Butler

[11] Patent Number: 5,018,252

[45] Date of Patent: May 28, 1991

[54] LOCKING FASTENER

[76] Inventor: David O. Butler, 1306 Vermont Ave., Tarpon Springs, Fla. 34689

[21] Appl. No.: 445,270

[22] Filed: Dec. 4, 1989

[51] Int. Cl.⁵ .............................................. A44B 21/00
[52] U.S. Cl. ........................................ 24/453; 24/654; 24/656
[58] Field of Search ............... 411/511, 439, 441, 446, 411/451, 452, 487, 508; 403/408.1, 388, 389; 24/652, 653, 654, 656, 573.2

[56] References Cited

U.S. PATENT DOCUMENTS

| | | | |
|---|---|---|---|
| 2,751,644 | 6/1956 | Pedersen | 403/388 X |
| 3,340,653 | 9/1967 | Steeg | 411/452 X |
| 3,479,071 | 11/1969 | Downing | 403/384 |
| 3,877,764 | 4/1975 | Hillier, Jr. | 403/408.1 X |
| 4,596,504 | 6/1986 | Gunther | 24/573.2 X |
| 4,727,629 | 3/1988 | Hoen et al. | 24/453 X |

FOREIGN PATENT DOCUMENTS

| | | | |
|---|---|---|---|
| 108778 | 10/1939 | Australia | 24/453 |
| 2518195 | 6/1983 | France | 403/408.1 |

Primary Examiner—James R. Brittain

[57] ABSTRACT

A locking fastener provides an improved fastener for fastenable materials or objects which include sheet-metal, plastics, paper products and wood. The locking fastener is comprised of a first and second portions projecting in spaced relationship from a base portion. The first projecting portion includes a slotted aperture through which a locking pin is retained. In one embodiment the slotted aperture of the first projecting portion includes opposed barbs along the upper and lower edges which interlock with the locking pin providing a one-way action of the locking pin, thus not allowing the removal of the locking pin. The second projecting portion includes a slotted aperture for the receiving of locking pin retained in first projecting portion. The spaced relationship of the first and second projecting portions from the base portion provides an access slot for fastenable materials or objects. The fastenable materials or objects include corresponding slotted apertures with those of the first and second projecting portions, and are inserted into the access slot. The retained locking pin of the first projecting portion is inserted through the apertures of the fastenable materials or objects and into the slotted aperture of the second projecting portion.

6 Claims, 3 Drawing Sheets

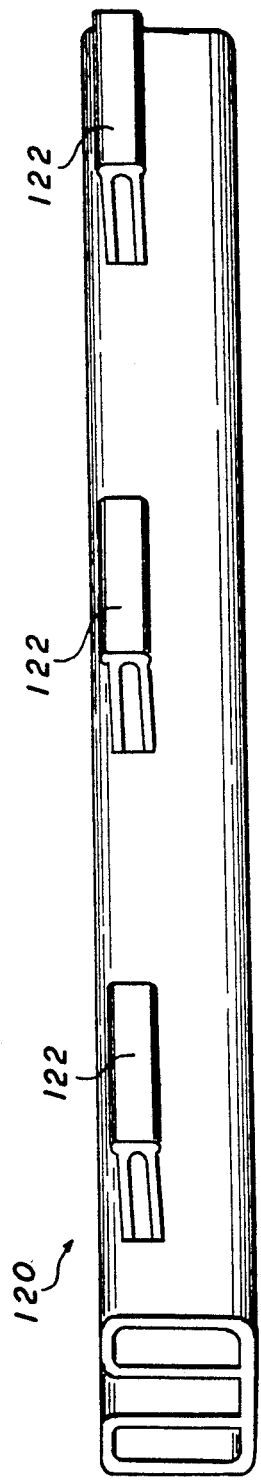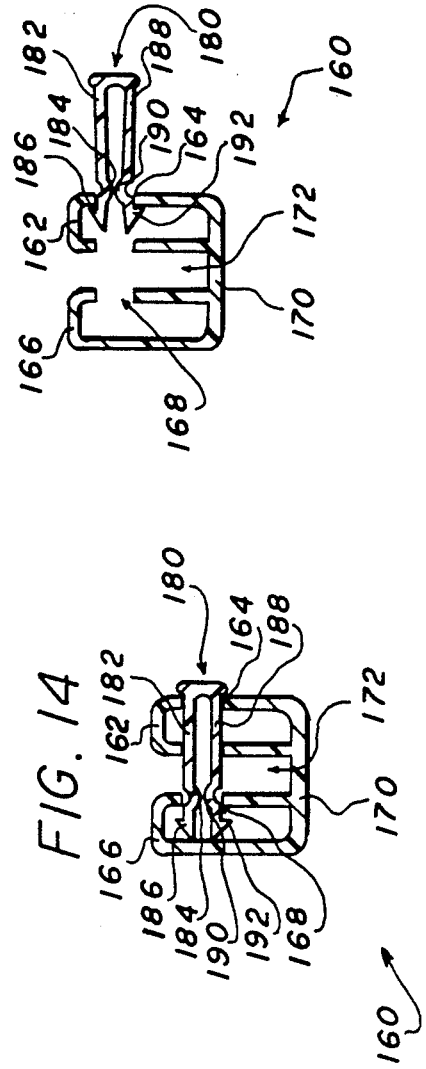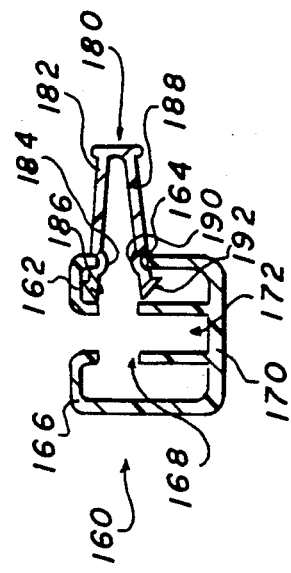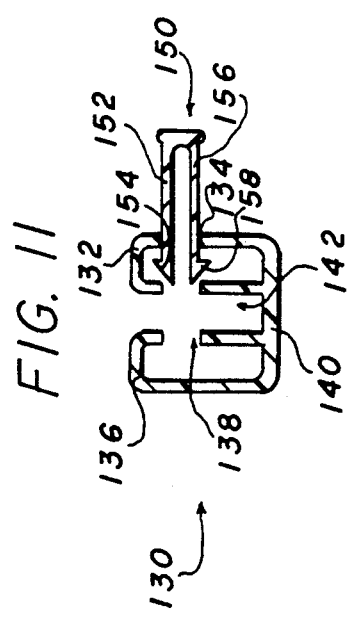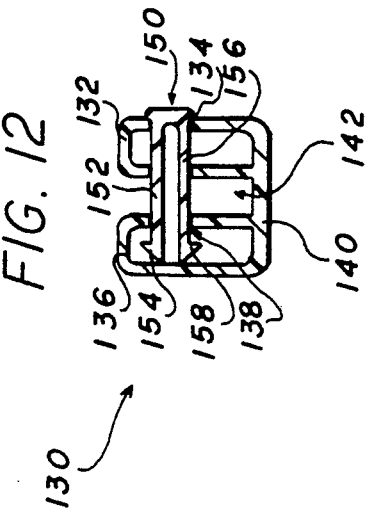

LOCKING FASTENER

FIELD OF THE INVENTION

The invention disclosed broadly relate to fasteners for fastenable materials or objects and more particularly to improvements in locking fasteners.

BACKGROUND OF THE INVENTION

Fasteners have long been used for the attaching or fastening of a variety of materials or objects. Many of these fasteners are expensive to produce and cumbersome to apply, many of which require the use of special tools for their application. Several of these fasteners are of the type which snap together yet are releaseable. Such prior art fasteners also include those which have two separate halves that are either clamped or pressed together. U.S. Pat. Nos. 4,819,309; 4,726,705; 4,444,321 and 2,565,065 provide illustrative examples. Other prior art showing related fasteners which also fail to solve the above stated problems as well as problems which result from fastener which can be altered to allow unwanted removal include U.S. Pat. Nos. 4,389,759; 3,874,133; 2,697,259; and 2,526,791.

OBJECTS OF THE INVENTION

Accordingly, it is one object of the present invention to provide an improved locking fastener for the fastening of fastenable material or objects.

It is another object of the present invention to provide an improved locking fastener which is easier to apply than has been available in the prior art.

It is a further object of the present invention to provide an improved fastener that reduces manufacturing and production costs.

It is another object of the present invention to provide an improved locking fastener which is more secure against the tampering or altering of its locking pin prior to its application thus not allowing unwanted removal from fastened material or objects.

It is yet another object of the present invention to provide an improved locking fastener which is more secure against tampering of its locking pin after its application thus not allowing unwanted removal from fastened material or objects.

SUMMARY OF THE INVENTION

The foregoing and other objects of the invention are realized in an illustrative embodiment of apparatus and are accomplished by the locking fastener disclosed herein. A locking fastener is disclosed for the fastening of fastenable materials or objects which would include sheet-metal, plastics, paper products and wood. The locking fastener is comprised of a first and second portions projecting in spaced relationship from a base portion. The first projecting portion includes a slotted aperture through which a locking pin is retained. In one embodiment the slotted aperture of the first projecting portion also includes opposed barbs along the upper and lower edges which interlock with the locking pin providing a one-way action of the locking pin, thus not allowing the removal of the locking pin. The second projecting portion includes a slotted aperture for the receiving of locking pin retained in first projecting portion. The spaced relationship of the first and second projecting portions from the base portion provides an access slot for fastenable materials or objects. The fastenable materials or objects include corresponding slotted apertures with those of the first and second projecting portions, and are inserted into the access slot. The retained locking pin of the first projecting portion is inserted through the apertures of the fastenable materials or objects and into the slotted aperture of the second projecting portion.

The resultant locking fastener invention provides an improved fastener for the fastening of fastenable material or objects. The invention is easier to apply than has been available in the prior art. The invention provides fastener that reduces manufacturing and production costs. The invention is more secure against the altering of its locking pin prior to its application thus not allowing unwanted removal from fastened material or objects. The invention is also more secure against the altering of its locking pin after its application thus not allowing unwanted removal from fastened material or objects.

DESCRIPTION OF THE DRAWINGS

The novel features which are believed to be characteristic of present invention are set forth in the appended claims. The invention itself, however, together with further objects and attendant advantages thereof, will become apparent and best understood by reference to the following detailed description taken in connection with the accompanying drawings setting forth by way of illustration and example certain embodiments of the invention in the several figures of which like references numerals identify like elements and in which:

FIG. 10 is a side perspective view of the locking fastener in an extended length embodiment.

FIG. 11 is a cross sectional view of the locking fastener having a barbed locking pin in its unlocked state.

FIG. 12 is a cross sectional view of the locking fastener having a barbed locking pin in its locked state.

FIG. 13 is a cross sectional view of the locking fastener having modified barbed locking pin in its unlocked state.

FIG. 14 is a cross sectional view of the locking fastener having a mod barbed locking pin in its locked state.

FIG. 15 a cross sectional view of the locking fastener having a modified barb locking pin showing its non-removal feature.

DETAILED DESCRIPTION OF THE PREFERRED EMBODIMENT

Figure 1:
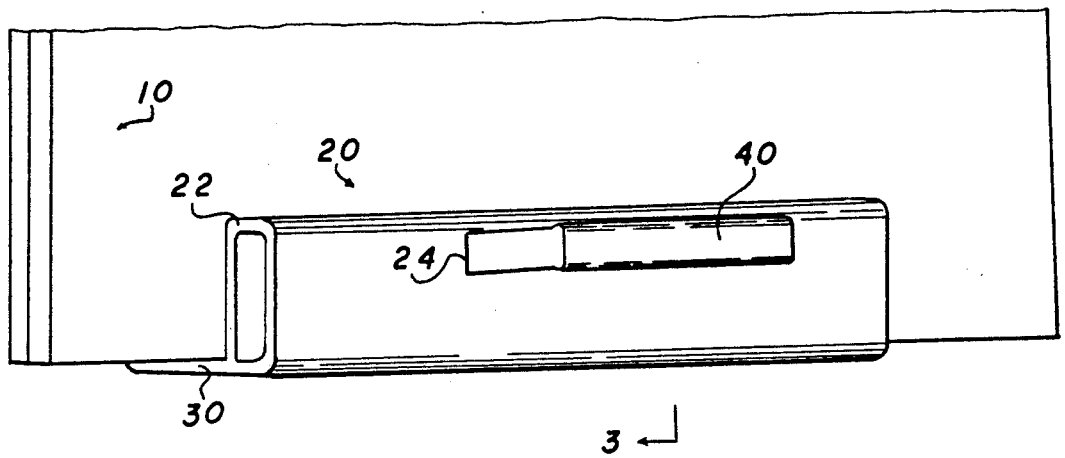
FIG. 1 is a side perspective view of the locking fastener in its unlocked state.
Figure 3:
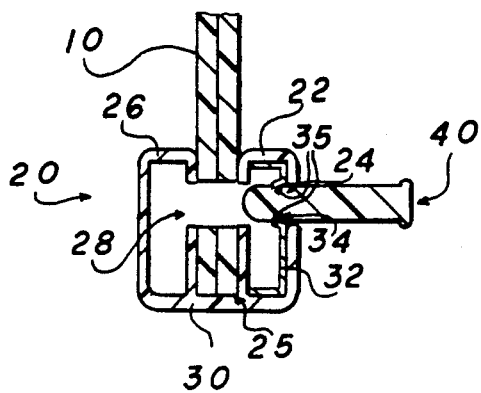
FIG. 3 is cross sectional view along section line 3—3 of FIG. 1.

Referring to FIG. 1, there is illustrated locking fastener 20 attached to fastenable materials 10 with the locking pin 40 in its unlocked state also shown to better advantage in FIG. 3 showing the locking fastener 20 in its first embodiment. The locking fastener 20 is comprised of a first projecting portion 22 and second projecting portion 26 in spaced relationship from a base portion 30. The first projecting portion 22 includes a slotted aperture 24 through which locking pin 40 is retained. The first projecting portion 22 includes a metal insert 32 which has a corresponding slotted aperture 34 to match the slotted aperture 24 of first projecting portion 22. The slotted aperture 34 of the metal insert 32 includes opposed barbs 35 along the upper and lower edges which interlock with the locking pin 40 providing a one-way action of the locking pin 40. The second projecting portion 26 includes a slotted aperture 28 for the receiving of locking pin 40 retained in first projecting portion 22. The spaced relationship of the first projecting portion 22 and second projecting portion 26 from the base portion 30 provides an access slot 25 for fastenable materials 10.

Figure 2:
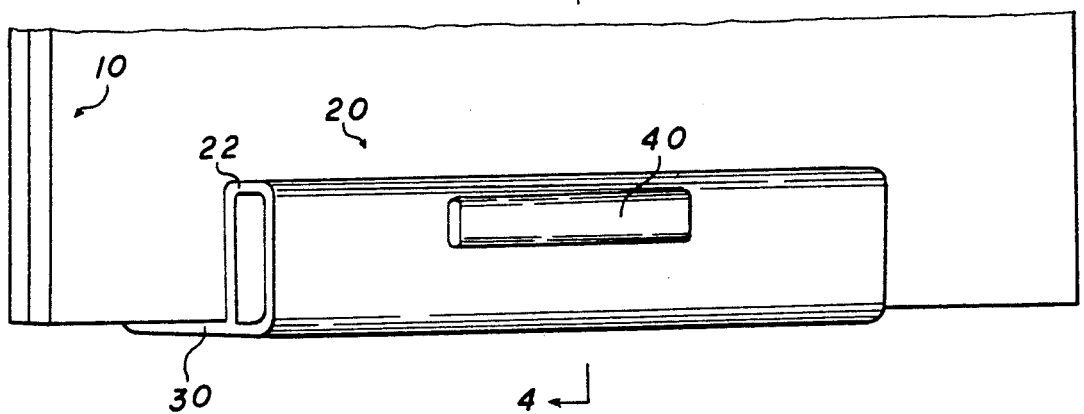
FIG. 2 is a side perspective view of the locking fastener in its locked state.
Figure 4:
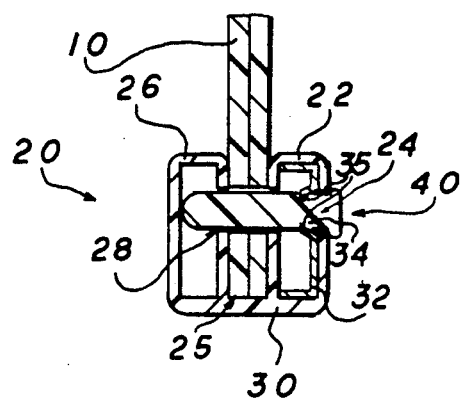
FIG. 4 is a cross sectional view along section line 4—4 of FIG. 2.

FIGS. 2 and 4 shows the locking fastener 20 attached to fastenable materials 10 in its locked state with the retained locking pin 40 of the first projecting portion 22 inserted through the slotted aperture 34 of the metal insert 32, fastenable materials 10 and into the slotted aperture 28 of the second projecting portion 26.

The locking fastener 20 could be made of many materials such as polymeric materials selected from the group consisting of acrylonitrile butadiene styrene, polyvinyl chloride, polyethylene, and polypropylene. The locking fastener 20 can be made by first making an elongate member having the cross sectional shape of locking fastener 20 preferably by the extrusion process, although other processes such as injection molding could also be used. The elongate member is then cut to any required length such as by the use of a saw. The slotted apertures 24 and 28 could then be machined into place. The locking pin 40 could also be made of many materials such as polymeric materials selected from the group consisting of acrylonitrile butadiene styrene, polyvinyl chloride, polyethylene, and polypropylene. The locking pin 40 can be made by first making an elongate member having the cross sectional shape of the locking pin 40 preferably by the extrusion process, although other processes such as injection molding could also be used. The elongate member is then cut to any required length such as by the use of a saw.

Figure 5:
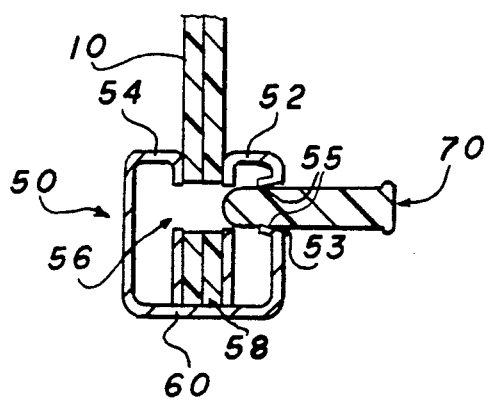
FIG. 5 is a cross sectional view of the locking fastener in its unlocked state having integral barbs in its slotted aperture.

FIG. 5 illustrates the second embodiment of the locking fastener 50 being constructed from sheet-metal, preferably through the use of such methods as the progressive die machining process. The locking fastener 50 is comprised of a first projecting portion 52 and a second projecting portion 54 in spaced relationship from a base portion 60. The first projecting portion 52 includes a slotted aperture 53 through which a locking pin 70 is retained. The slotted aperture 53 includes opposed barbs 55 along the upper and lower edges which interlock with the locking pin 70 providing a one-way action of the locking pin 70. The second projecting portion 54 includes a slotted aperture 56 for the receiving of locking pin 70 retained in first projecting portion 52. The spaced relationship of the first projecting portion 52 and the second projecting portion 54 from the base portion 60 provides an access slot 58 for fastenable materials.

Figure 6:
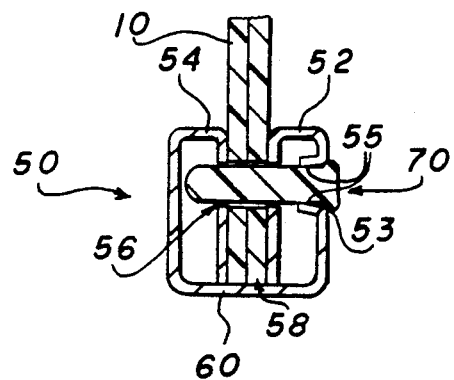
FIG. 6 is a cross sectional view of the locking fastener in its locked state having integral barbs in its slotted aperture.

FIG. 6 shows the second embodiment of the locking fastener attached to fastenable materials in its locked state with the retained locking pin 70 of the first projecting portion 52 inserted through opposed barbs 55 of the first projecting portion 52, fastenable materials 10 and into the slotted aperture 56 of the second projecting portion 54.

Figure 7:
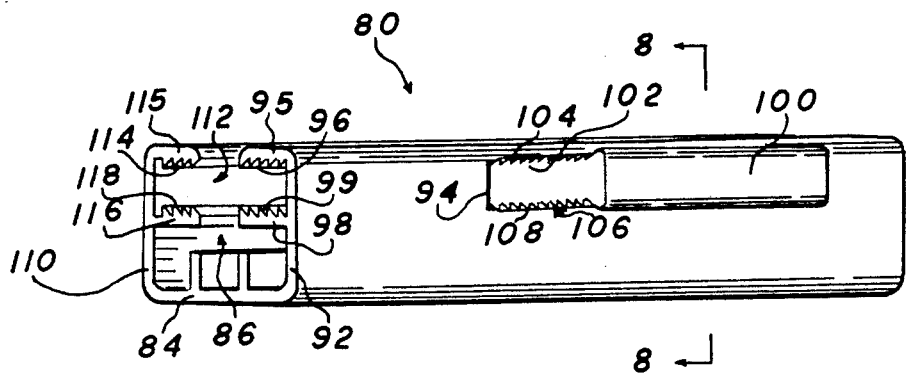
FIG. 7 is a side perspective view of the invention as a sawtooth locking fastener.
Figure 8:
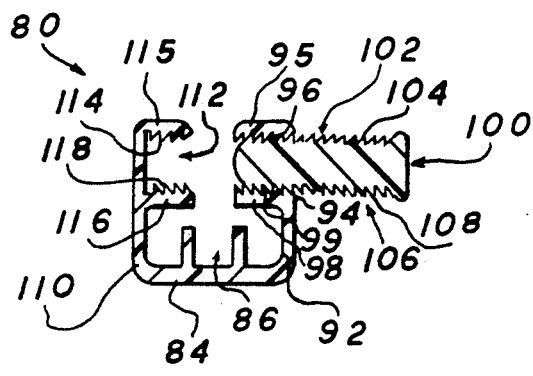
FIG. 8 is a cross sectional view along section line 8—8 of FIG. 7.

The third embodiment of the invention, which features the saw tooth lock, is shown in FIG. 7. This embodiment provides another locking method for the locking fastener 80. The locking fastener 80 is shown in its unlocked state and is shown to better advantage in FIG. 8 having a first projecting portion 92 and a second projecting portion 110 in spaced relationship from a base portion 84. The first projecting portion 92 includes a slotted aperture 94 through which a sawtooth locking pin 100 is retained. The first projecting portion 92 also includes a first sawtooth portion 95 projecting outwardly over the slotted aperture 94 having a downwardly projecting serrated surface 96 and a second sawtooth portion 98 projecting outwardly under the slotted aperture 94 having an upwardly projecting serrated surface 99. The sawtooth locking pin 100 retained within the first projecting portion 92 includes along its upper surface 102 upwardly projecting serrations 104 and along it bottom surface 106 downwardly projecting serrations 108. The opposing serrations of the first sawtooth portion 96 and the second sawtooth portion 98 of the first projecting portion 92 interlock with the serrations along the upper surface 102 and bottom surface 106 of the sawtooth locking pin 100 providing a one-way action of the sawtooth locking pin 100. The second projecting portion 110 includes a slotted aperture 112 for the receiving of sawtooth locking pin 100 retained in first projecting portion 92. The second projecting portion 110 also includes a first sawtooth portion 115 projecting outwardly over the slotted aperture 112 having a downwardly projecting serrated surface 114 and a second sawtooth portion 116 projecting outwardly under the slotted aperture 112 having an upwardly projecting serrated surface 118. The spaced relationship of the first projecting portion 92 and second projecting portion 110 provide an access slot 86 for fastenable materials or objects.

Figure 9:
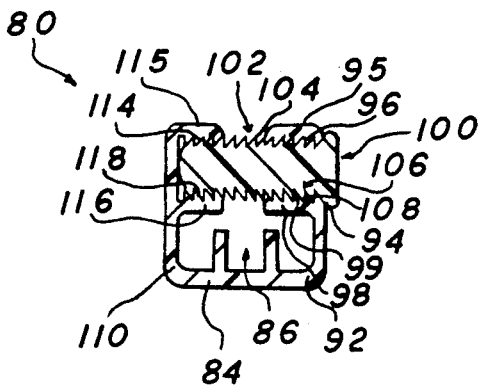
FIG. 9 is a cross sectional view of a sawtooth locking fastener in its locked state.

FIG. 9 shows the third embodiment of the locking fastener 80 in its locked state with the retained sawtooth locking pin 100 of the first projecting portion 92 inserted through the first sawtooth portion 95 and second sawtooth portion 98 of the first projecting portion 92 and into slotted aperture 112 and through the first sawtooth portion 115 and second sawtooth portion 116 of the second projecting portion 110.

Referring to FIG. 10 the invention is illustrated in an extended length for use on materials or objects requiring the fastening of extended surface edges. The locking fastener 120 includes a plurality of locking pins 122.

FIGS. 11 and 12 illustrate the fourth embodiment of the locking fastener 130 comprised of a first projecting portion 132 and a second projecting portion 136 in spaced relationship from a base portion 140. The first projecting portion 132 includes a slotted aperture 134 through which a barbed locking pin 150 is retained. The barbed locking pin 150 includes a first outwardly projecting portion 152 extending below first outwardly projecting portion 152 having an upwardly projecting barb 154 and a second outwardly projecting portion 156 having a downwardly projecting barb 158. The upwardly projecting barb 154 and the downwardly projecting barb 158 interlock with the slotted aperture 134 providing a one-way action of the barbed locking pin 150. The second projecting portion 136 includes a slotted aperture 138 for the receiving of barbed locking pin 150 retained in first projecting portion 132. The spaced relationship of the first projecting portion 132 and second projecting portion 136 provide an access slot 142 for fastenable materials or objects. FIG. 12 shows the locking fastener 130 in its locked state with the retained barbed locking pin 150 of the first projecting portion 132 inserted into the slotted aperture 138 of the second projecting portion 136.

FIGS. 13 through 15 illustrates the fifth embodiment of the locking fastener 160 comprised of a first projecting portion 162 and a second projecting portion 166 in a spaced relationship from a base portion 170. The first projecting portion 162 includes a slotted aperture 164 through which modified barbed locking pin 180 is retained. The modified barbed locking pin 180 includes a first outwardly projecting portion 182 having a downwardly projecting U-shaped portion 184 and an upwardly projecting barb 186 and a second outwardly projecting portion 188 extending below first outwardly projecting portion 182 having an upwardly projecting U-shaped portion 190 and a downwardly projecting barb 192. The downwardly projecting U-shaped portion 184 and the upwardly projecting U-shaped portion 190 engage with the upper and lower edges of the slotted aperture 164 shown in FIG. 13 and prevents any unintentional insertion of locking pin 180. The second projecting portion 166 includes a slotted aperture 168 for the receiving of the modified barbed locking pin 180. The spaced relationship of the first projecting portion 162 and second projecting portion 166 provide an access slot 172 for fastenable materials or objects. FIG. 14 shows the locking fastener 180 in its locked state with the downwardly projecting U-shaped portion 184 and the upwardly projecting U-shaped portion 190 disengaged from the slotted aperture 164 of the first projecting portion 162 and inserted into the slotted aperture 168 of the second projecting portion 166. FIG. 15 shows the unremovable feature of the modified barbed locking pin 180 displaying how applied force used in attempted removal, such as the squeezing of the first outwardly projecting portion 182 and second outwardly projecting portion 188 of modified barbed locking pin 180 resulting in opposed flaring of upwardly projecting barb 186 and downwardly projecting barb 192 along the first downwardly projecting U-shaped portion 184 and upwardly projecting U-shaped portion 190 providing a one-way action of modified barbed locking pin 180.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

What is claimed is:

1. A locking fastener for fastening fastenable materials or objects comprising, in combination:
    a base portion;
    a first and second projecting portion in spaced relationship from said base portion; and
    a retained locking pin;
    said first projecting portion having an aperture disposed through which said locking pin is retained, a metal insert therein having an aperture with opposed straight, barbs along its upper and lower edges oriented for interlocking engagement with upper and lower surfaces of said locking pin retained in said aperture of said first projecting portion;
    said second projecting portion having an aperture disposed for receiving said interlocking pin retained in said aperture of said first projecting portion;
    said spaced relationship of said first projecting portion and said second projecting portion from said base portion provides an access slot from said fastenable materials or objects;
    whereby said locking pin retained in said aperture of said first projecting portion can be inserted into said aperture of said second projecting portion.

2. A locking fastener for fastening fastenable materials or objects comprising, in combination:
    a base portion;
    a first and second projecting portion projecting in spaced relationship from said base portion; and
    a retained locking pin;
    a first projecting portion having an aperture disposed through which said locking pin is retained, said aperture includes opposed straight, barbs along its upper and lower edges oriented for interlocking engagement with upper and lower surfaces of said locking pin retained in said aperture of said first projecting portion;
    said second projecting portion having an aperture disposed for receiving said locking pin retained in said first projecting portion;
    said spaced relationship of said first and second projecting portions from said base portion provides an access slot for said fastenable materials or objects;
    whereby said locking pin retained in said aperture of said first projecting portion can be inserted into said aperture of said second projecting portion.

3. A locking fastener for fastening fastenable materials or objects comprising, in combination:
    a base portion;
    a first and second projecting portion projecting in spaced relationship from said base portion; and
    a retained locking pin;
    said first projecting portion having an aperture disposed through which said locking pin is retained, a first sawtooth portion projecting outwardly projecting teeth, a second sawtooth portion projecting outwardly under said aperture having a plurality of straight, upwardly projecting teeth;
    said locking pin includes along its upper surface a plurality of straight, upwardly projecting teeth and along its bottom surface a plurality of straight, downwardly projecting teeth;
    said teeth of said first sawtooth portion over said aperture of said first projecting portion and said teeth of said second sawtooth portion under said aperture of said first projecting portion oriented for interlocking engagement with said teeth of said upper surface and said teeth of said lower surface of said locking pin retained in said aperture of said first projecting portion;
    said second projecting portion having an aperture for receiving said locking pin retained in said first projecting portion, a first sawtooth portion projecting outwardly over said aperture having a plurality of straight, downwardly projecting teeth, a second sawtooth portion projecting outwardly under said aperture having a plurality of straight, upwardly projecting teeth;

said spaced relationship of said first and second projecting portions provides an access slot for said fastenable materials or objects;

whereby said locking pin retained in said aperture of said first projecting portion can be inserted into said aperture of said second projecting portion.

4. The combination of claim 1, wherein said locking fastener further comprises:

an additional plurality of retained locking pins;

said first projecting portion having additional apertures disposed through which said locking pins are retained, an additional plurality of metal inserts therein having apertures with opposed straight, barbs along its upper and lower edges oriented for interlocking engagement with upper and lower surfaces of said locking pins retained in said apertures of said first projecting portion;

said second projecting portion having additional apertures disposed for receiving said locking pins retained in said apertures of said first projecting portion;

whereby said locking pins retained in said apertures of said first projecting portion can be inserted into said apertures of said second projecting portion.

5. The combination of claim 2, wherein said locking fastener further comprises:

an additional plurality of retained locking pins;

a first projecting portion having additional apertures disposed through which said locking pins are retained, said apertures includes of said first projecting portion include opposed straight, barbs along its upper and lower edges oriented for interlocking engagement with upper and lower surfaces of said locking pins retained in said apertures of said first projecting portion;

said second projecting portion having additional apertures disposed for receiving said locking pins retained in said first projecting portion;

whereby said locking pins retained in said apertures of said first projecting portion can be inserted into said apertures of said second projecting portion.

6. The combination of claim 3, wherein said locking fastener further comprises:

an additional plurality of retained locking pins;

said first projecting portion having additional apertures disposed through which said locking pins are retained, a first sawtooth portion projecting outwardly over said apertures of said first projecting portion having a plurality of straight, downwardly projecting teeth, a second sawtooth portion projecting outwardly under said aperture apertures of said first projecting portion having a plurality of straight, upwardly projecting teeth;

said locking pins includes along its upper surface a plurality of straight, upwardly projecting teeth and along its bottom surface a plurality of straight, downwardly projecting teeth;

said teeth of said first sawtooth portion over said apertures of said first projecting portion and said teeth of said second sawtooth portion under said apertures of said first projecting portion oriented for interlocking engagement with said teeth of said upper surface and said teeth of said lower surface of said locking pin retained in said aperture of said first projecting portion;

said second projecting portion having additional apertures for receiving said locking pins retained in said first projecting portion, a first sawtooth portion projecting outwardly over said apertures of said second projecting portion having a plurality of straight, downwardly projecting teeth, a second sawtooth portion projecting outwardly under said apertures having a plurality of straight, upwardly projecting teeth;

whereby said locking pins retained in said apertures of said first projecting portion can be inserted into said apertures of said second projecting portion.

* * * * *